United States Patent [19]

Goto et al.

[11] Patent Number: 5,102,732

[45] Date of Patent: Apr. 7, 1992

[54] MAGNETIC RECORDING MEDIUM

[75] Inventors: Narito Goto; Yasuo Ando, both of Hino, Japan

[73] Assignee: Konica Corporation, Tokyo, Japan

[21] Appl. No.: 375,387

[22] Filed: Jul. 3, 1989

[30] Foreign Application Priority Data

Jul. 15, 1988 [JP] Japan .................. 63-176816

[51] Int. Cl.$^5$ ............................. G11B 23/00
[52] U.S. Cl. .................... 428/329; 428/403; 428/404; 428/694; 428/900
[58] Field of Search ............... 428/329, 694, 900, 403, 428/404

[56] References Cited

U.S. PATENT DOCUMENTS

| | | | |
|---|---|---|---|
| 4,390,361 | 6/1983 | Sueyoshi et al. | 428/404 |
| 4,407,901 | 10/1983 | Miyatsuka et al. | 428/694 |
| 4,537,833 | 8/1985 | Kasuga et al. | 428/694 |
| 4,752,530 | 6/1988 | Yamada et al. | 428/694 |
| 4,801,505 | 1/1989 | Ejiri et al. | 428/403 |
| 4,956,220 | 9/1990 | Sueyoshi et al. | 428/403 |

Primary Examiner—Paul J. Thibodeau
Attorney, Agent, or Firm—Jordan B. Bierman; Bierman and Muserlian

[57] ABSTRACT

A magnetic recording medium is disclosed which comprises a non-magnetic support and a magnetic layer comprising ferromagnetic powder, provided on the support. The magnetic layer contains silicon and aluminum, wherein the silicon content of ferromagnetic powder is not less than 0.1% by weight, and the ratio by weight of silicon to aluminum is not less than 3, and magnetic layer contains a binder having an anionic functional group.

The magnetic recording medium is excellent in the dispersibility of the ferromagnetic powder of the magnetic layer, and in the balance of magnetic characteristics such as S/N ratio, a squareness ratio, and electromagnetic conversion characteristic, while keeping an excellent running durability.

5 Claims, No Drawings

MAGNETIC RECORDING MEDIUM

FIELD OF THE INVENTION

This invention relates to a magnetic recording medium and, more particularly, to a magnetic recording medium excellent in dispersibility and dispersion stability of ferromagnetic powder and also excellent in electromagnetic conversion characteristics and running durability.

BACKGROUND OF THE INVENTION

Basically, a magnetic recording medium is comprised of a non-magnetic support and a magnetic layer containing ferromagnetic powder and is constructed by providing the magnetic layer onto the non-magnetic support. The magnetic layer is generally comprised of ferromagnetic powder dispersed in a binder.

In magnetic recording media having such a construction as mentioned above and particularly in those for VTR use, for example, those having the newly specified 8-mm-width standard, which are narrower in width than the conventional ½-inch-width standard, have been put on the market and are getting popularized. Under the above-mentioned circumstances, there have been strong demands for magnetic recording media capable of keeping running durability and performing high density recording operation.

In the meantime, in recent years, there have been the attempts to ferromagnetize magnetic powder and making the powder be fine-grained so that the magnetic recording media may be able to perform high density recording operations.

The ferromagnetization and fine-granulation of such ferromagnetic powder have had the problems. For example, the cohesive action of ferromagnetic powder with each other are enhanced. Therefore, the dispersibility of the ferromagnetic powder is deteriorated so that a high density recording operation may adversely be hindered.

On the other hand, the fine-granulation of ferromagnetic powder will lead to be so inconvenient that, for example, the running durability of magnetic recording media is lowered, such as a scratch on the surface of the magnetic layer of the magnetic recording medium, an edge damage, and so forth.

To solve the above-mentioned inconvenience, there have been attempted to apply the methods of treating ferromagnetic powder in advance with an aluminum compound or a silicon compound, or an aluminum compound and a silicon compound in combination.

However, it can still hardly be said that the magnetic recording media prepared in the above-mentioned methods can fully satisfy the dispersibility of ferromagnetic powder and running durability of magnetic recording medium.

This invention has been devised by taking the above-mentioned circumstances into consideration.

SUMMARY OF THE INVENTION

It is an object of the invention to provide a magnetic recording medium excellent in the dispersibility of the ferromagnetic powder of a magnetic layer, the balance of the magnetic characteristics such as a S/N ration, a squareness ration and so forth, and electromagnetic conversion characteristics, while keeping an excellent running durability.

After the inventors have devoted themselves to studying repeatedly to solve the above-mentioned problems, they have discovered the following facts and thereby achieved the invention. A magnetic recording medium comprising a non-magnetic support having thereon a magnetic layer comprising ferromagnetic powder which contains silicon and aluminum in a specific proportion and dispersed in a specific binder, such magnetic recording medium is excellent in the dispersibility of the ferromagnetic powder of the magnetic layer, the balance of magnetic characteristics such as a S/N ration, a squareness ratio or the like, and electromagnetic conversion characteristics, while keeping an excellent running durability.

To be more concrete, the magnetic recording medium of the invention is characterized in that ferromagnetic powder contains silicon and aluminium, that the silicon contents thereof is not less than 0.1% by weight, that the ratio by weight of silicon to aluminium is not less than 3, and that the magnetic layer thereof contains a binder having an anionic tive functional group.

DETAILED DESCRIPTION OF THE INVENTION

The non-magnetic support and the magnetic layer constituting a magnetic recording medium of the invention will now be detailed below.

Non-Magnetic Support

The raw materials constituting the above-mentioned non-magnetic support include, for example, polyesters such as polyethyleneterephthalate, polyethylene-2,6-naphthalate, and so forth; polyolefins such as polypropylene, and so forth; cellulose derivatives such as cellulose triacetate, cellulose diacetate, and so forth; plastics such as polycarbonate, and so forth. For the raw materials, a variety of metals and ceramics including, for example, metals such as Cu, Al, Zn, and so forth; glass; the so-called new ceramics such as boron nitride, silicon carbide, and so forth; may further be used.

There is no special limitation to the morphologies of the above-mentioned non-magnetic supports. The supports may be of any morphologies such as a tape, sheet, card, disk, drum or the like. The supports may be used upon selecting a material from various kinds thereof so as to meet a desirable morphology or the requirements.

The thickness of the foregoing non-magnetic support is within the range of, usually, 3 to 100 $\mu$m and, preferably, 5 to 50 $\mu$m when the support is in the tape or sheet form: and, usually, 30 to 100 $\mu$m when in the disk or card form. In the case of a drum form, it is allowed to take any forms such as a cylindrical form and so forth, provided the form can meet a recorder used.

On the above-mentioned non-magnetic support, a back-coat layer may be provided onto the side of the support, i.e., the rear surface to which no magnetic layer is coated on, for the purposes of improving running durability of a magnetic recording medium and preventing the medium from static charge, erroneous transfer, and so forth.

On the above-mentioned non-magnetic support, an interlayer such as an adhesive layer may also be provided onto the side of the support, to which the magnetic layer is coated on, for the purposes of improving adhesive property of the magnetic layer to the non-magnetic support, and so forth.

Magnetic Layer

The above-mentioned magnetic layer is provided onto the above-mentioned non-magnetic support.

The above-mentioned magnetic layer is a layer comprising the above-mentioned ferromagnetic powder dispersed in a binder.

The above-mentioned ferromagnetic powders include, for example, Co-containing iron oxide magnetic powder, iron oxide magnetic powder, ferromagnetic alloy powders containing ferromagnetic metals such as Fe, Ni, Co, and so forth as the principal components, e.g., Fe-Al alloy powder, Fe-Al-P' alloy powder, Fe-Ni-Co alloy powder, Fe-Mn-Zn alloy powder, Fe-Ni-Zn alloy powder, Fe-Co-Ni-Cr alloy powder, Fe-Co-Ni-P alloy powder, Co-Ni alloy powder, Co-P alloy powder, and so forth.

Among them, more preferable one is Co-containing iron oxide magnetic powder.

The above-given Co-containing iron oxide magnetic powders include, for example, Co-containing $\gamma$-$Fe_2O_3$ powder, Co-containing $Fe_3O_4$ powder, Co-containing $FeO_x (4/3 < x < 3/2)$ powder, and so forth.

In the above-given ferromagnetic powder, the specific surface area thereof obtained in BET method is not less than 20 $m^2/g$ and, more preferably, 20 to 80 $m^2/g$.

When the above-mentioned specific surface area is less than 20 $m^2/g$, there may be some instances where the S/N ratio of a magnetic recording medium may be lowered.

In the invention, one of the most important points is that the above-mentioned ferromagnetic powder contains silicon and aluminium.

The above-mentioned silicon and aluminium each adhere to the surface of the ferromagnetic powder having a high surface activity and then work to reduce the amount of a lubricant adsorbing to the ferromagnetic powder, to make excellent the dispersibility of the ferromagnetic powder in a magnetic layer, as well as to enhance the running durability of the magnetic recording medium.

The above-mentioned silicon may be made adhere to the ferromagnetic powder in such a manner, for example, that a soluble silicon compound is added into a dispersed solution prepared by dispersing the ferromagnetic powder in an aqueous alkali solution.

The above-mentioned silicon compounds include, for example, silicic acids such as orthosilicic acid $H_4SiO_4$, metasilicic acid $H_2SiO_3$, meta-di-silicic acid $H_2Si_2O_5$, meta-tri-silicic acid $H_4Si_3O_8$, meta-tetra-silicic acid $H_6Si_4O_{11}$, and so forth; silicon monoxide and silicon dioxide; metal silicates such as sodium orthosilicate $Na_4SiO_4$, sodium metasilicate $Na_2SiO_3$, potassium metasilicate $K_2SiO_3$, calcium orthosilicate $Ca_4SiO_4$, calcium metasilicate $Ca_2SiO_3$, barium metasilicate $Ba_2SiO_3$, cobalt metasilicate $Co_2SiO_3$, and so forth.

The above-given silicon compounds may be used independently or in combination.

The above-mentioned aluminium may be made adhere to the ferromagnetic powder in the same manner as in the case of the above-mentioned silicon, that is, in the manner that an aluminum powder or an aluminum compound is added into a dispersed solution.

The above-mentioned aluminium compounds include, for example, aluminium oxide $Al_2O_3$, aluminium fluoride $AlF_3$, aluminium chloride $AlCl_3$, aluminium bromide $AlBr_3$, aluminium iodide $AlI_3$, aluminium hydroxide $Al(OH)_3$, aluminium sulfate $Al_2(SO_4)_3$, aluminium nitrate $Al(NO_3)_3$, aluminium phosphate $AlPO_4$, aluminium carbide $Al_4C_3$, aluminium nitride $AlN$, aluminium sulfide $Al_2S_3$, and so forth.

In the invention, another one of the important points is that the silicon content to the above-mentioned ferromagnetic powder is not less than 0.1% by weight and, more preferably, 0.1 to 1% by weight, and the proportion by weight of silicon to aluminium is not less than 3.

When the above-mentioned silicon content is less than 0.1% by weight, not only the surface activity of the ferromagnetic powder cannot be diminished, but also the ferromagnetic powder cannot be inhibited from excessive adsorption of a binder or dispersant thereto. On the other hand, when the silicon content exceeds 1% by weight, there may be some instances where no effect may be compensated in correspondence with the increase of the content.

When a weight proportion of silicon to aluminium is less than 3, an amount of magnetic head abraded by a magnetic recording medium is increased, so that the life of the magnetic head is shortened.

In the invention, a further important point is that the binder has an anionic functional group. Such a binder having an anionic functional group is hereinafter sometimes called simply to as resin A.

In the binder of magnetic recording medium of the invention, resin A works to make excellent the dispersibility of the ferromagnetic powder in the binder, in cooperation with the functions of the foregoing silicon and aluminium.

The anionic functional groups in the resin A include, for example, —$SO_3M$, —$OSO_2M$, —$COOM$, and

wherein M represents either one atom of hydrogen, lithium, sodium and potassium; and $M^1$ and $M^2$ represent each either one atom of hydrogen, lithium, potassium, and sodium, or an alkyl group, provided $M^1$ and $M^2$ may be different from or the same with each other.

The above-mentioned resin A may be prepared, for example, by modifying a resin such as those of vinyl chloride copolymer, polyester, polyurethane and so forth and introducing the foregoing anionic functional group thereinto.

To be more concrete, resin A may be prepared by condensing, through a dehydrochloride reaction, such a resin as those of vinyl chloride copolymer, polyester, polyurethane, and so forth, and such a compound containing anionic functional group and chlorine in the molecules thereof as Cl—$CH_2CH_2SO_3M$, Cl—$CH_2CH_2OSO_2M$, Cl—$CH_2COOM$, and

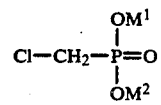

in which M, $M^1$ and $M^2$ are each synonymous with those given heretofore.

Among the resin A thus prepared, a preferable one is a resin prepared by introducing an anionic functional group into a vinyl chloride copolymer.

The above-mentioned vinyl chloride copolymer into which the above-mentioned anionic functional group is introduced include, for example, a vinyl chloride-vinyl acetate-vinyl alcohol copolymer, a vinyl chloride-vinyl propionate-vinyl alcohol copolymer, a vinyl chloride-vinyl acetate-vinyl maleate-vinyl alcohol copolymer, a vinyl chloride-vinyl propionate-vinyl maleate-vinyl alcohol copolymer, and so forth.

The above-mentioned vinyl chloride copolymer into which the above-mentioned anionic functional group is introduced also include, for example, copolymers prepared by copolymerizing a vinyl chloride monomer with copolymerizable monomer containing an alkali salt of sulfonic acid or phosphoric acid and, if required, with the other copolymerizable monomer.

The copolymers are prepared in vinyl-polymerization, Therefore, they may readily be synthesized and various copolymer components may selectively be used. Further, the characteristics of copolymers may be adjusted most suitably.

The above-mentioned metal salts of sulfonic acid or phosphoric acid are alkali metals including, typically, sodium, potassium and lithium. In particular, potassium salt is preferable from the viewpoints of solubility, reactivity, yield, and so forth.

The above-mentioned copolymerizable monomers each containing a sulfonic acid salt include, for example,
$CH_2=CHSO_3M$,
$CH_2=CHCH_2SO_3M$,
$CH_2=C(CH_3)CH_2SO_3M$,
$CH_2=CHCH_2OCOCH(CH_2COOR)SO_3M$,
$CH_2=CHCH_2OCH_2CH(OH)CH_2SO_3M$,
$CH_2=C(CH_3)COOC_2H_4SO_3M$,
$CH_2=CHCOOC_4H_8SO_3M$,
$CH_2=CHCONHC(CH_3)_2CH_2SO_3M$ and so forth.

Phosphoric acid salts include, for example,
$CH_2=CHCH_2OCH_2CH(OH)CH_2-O-PO_3M^3Y^1$,
$CH_2=CHCONHC(CH_3)_2CH_2-O-PO_3M^3Y^2$,

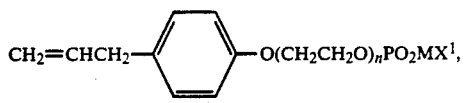

$CH_2=CHCH_2O(CH_2CH_2O)_mPOMX^2$ wherein M represents an alkali metal; R represents an alkyl group having 1 to 20 carbon atoms; $Y^1$ represents a hydrogen atom, M, or $CH_2=CHCH_2OCH_2CH(OH)CH_2-$; $Y^1$ represents a hydrogen atom, M, or $CH_2CH=CONHC(CH_3)_2CH-$; $X^1$ represents

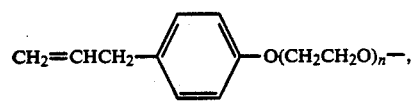

OH or OM; $X^2$ represents $CH_2=CHCH_2O(CH_2CH_2O)_m-$, OH, or OM; and m and n are each an integer of 1 to 100.

The above-mentioned copolymerizable monomers which may be copolymerized if required include, for example, various vinyl esters, vinylidene chloride, acrylonitrile, methacrylo nitrile, a variety of acrylic acid esters, methacrylic acid esters, ethylene, propylene, isobutene, butadiene, isoprene, vinylether, arylether, aryl ester, acrylamide, methacrylamide, maleic acid, maleic acid ester, and so forth.

The above-mentioned copolymers are polymerized in such a polymerizing method as those of emulsion-polymerization, solution-polymerization, suspension-polymerization, block-polymerization, and so forth. In any of such polymerizing methods, it is allowed, if required, to apply any known techniques such as the split or continuous addition of a molecular weight modifier, a polymerization initiator, or monomers.

It is preferred that the above-mentioned copolymers further contain an epoxy group or a hydroxyl group.

Meanwhile, the conventional vinyl chloride copolymers have been the copolymers comprising, for example, the following monomer units.

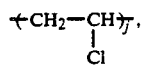

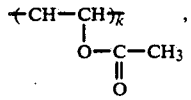

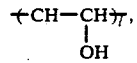

wherein j, k and l are each an integer.

It may, however, be considered herein that a group of $CH_3CO-O-$ can hardly contribute to a cross-linking reaction with a hardener or the like.

In this invention, it is, therefore, preferable to add an epoxy group such as

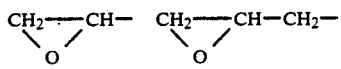

in place of $CH_3CO$.

To be more concrete, the resins having the combination of the following units may be exemplified.

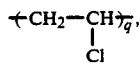

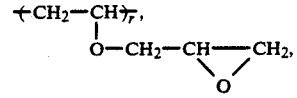

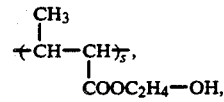

wherein q, r, s and t are each an integer; and Z represents a monomer unit part containing an alkali metal salt of sulfo or phospho group.

Besides the above, the following exemplifications may be given.

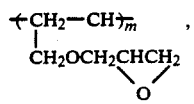

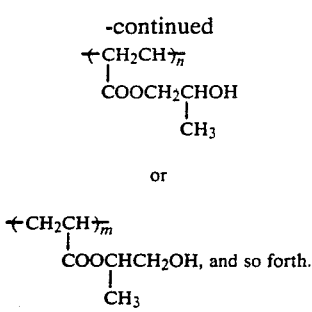

or

Molecular weight of the above-mentioned resin A is, usually, 5000 to 80000 and, preferably, 10000 to 30000. When the molecular weight exceeds 80000, the viscosity of a magnetic paint becomes so high that it exceeds the allowable limit. There may be some instances where the friction coefficient of a magnetic layer may be raised when a magnetic recording medium is prepared, and the working efficiency may be worsened in the production processes. On the other hand, when the molecular weight is less than 50000, unreacted portions may be produced and low molecular weight components may remain as they are, in the process from the step where magnetic paint is coated on the above-mentioned non-magnetic support to the step where the magnetic paint is hardened by making use of a hardener, therefore, the physical properties of the coated layer may sometimes be deteriorated.

The compounding proportion of the above-mentioned resin A is, usually 5 to 30 parts by weight to 100 parts by weight of the above-mentioned ferromagnetic powder and, more preferably, 5 to 20 parts by weight.

When the above-mentioned compounding proportion is set within the above-mentioned range, the dispersibility of the above-mentioned ferromagnetic powder in a magnetic layer can be made excellent and the dispersing speed can also be improved.

In this invention, when adding the above-mentioned resin together with a polyisocyanate type hardener into a binder, the durability of the magnetic layer can be improved.

The above-mentioned polyisocyanate type hardeners applicable to the invention include, for example, bifunctional isocyanates such as tolylenediisocyanate, diphenylmethanediisocyanate, hexanediisocyanate and so forth; trifunctional isocyanates such as Colonate L—a trade name, manufactured by Japan Polyurethane Industrial Co.—, Desmodule L—a trade name, manufactured by Bayer AG.—and so forth; those having conventionally been used for hardeners, such as urethane prepolymer containing isocyanate group each at the both ends: and polyisocyanates which can be used for hardeners.

The above-mentioned hardeners each may be used in an amount of, usually, 5 to 80 parts by weight to 100 parts by weight of the total amount of the binders used.

In a magnetic layer, the compounding proportion of the above-mentioned binder, including a hardener if used, to the above-mentioned ferromagnetic powder is, usually, 1 to 200 parts by weight to 100 parts by weight and, more preferably, 1 to 50 parts by weight thereto. If an amount of the binder compounded is too large, the amount of the ferromagnetic powder compounded is resultingly reduced, so that the recording density of a magnetic recording medium may sometimes be lowered. If too small, the strength of the magnetic layer is lowered, so that the running durability of the magnetic recording medium may sometimes be lowered.

In the magnetic recording media of the invention, the magnetic layer thereof are allowed to contain not only the above-mentioned ferromagnetic powder, silicon, aluminium, a binder, and the above-mentioned hardener, but further a lubricant, an abrasive and an antistatic agent, provided the objects of the invention cannot be spoiled.

As for the above-mentioned lubricants, for example, fatty acids and the fatty acid esters may suitably be used.

When using the above-mentioned fatty acid and the fatty acid esters in combination, it is possible to remedy the defects caused in individual use while displaying the special features of the fatty acid and fatty acid esters each; to improve the lubrication effects; and to enhance the still-image durability, running stability, S/N ratio, and so forth. In such a case, the above-mentioned fatty acid may be added in an amount of, usually, 0.2 to 10 parts by weight to 100 parts by weight of the above-mentioned ferromagnetic powder used and, more preferably, 0.3 to 8.0 parts by weight. When the fatty acid is added in an amount of less than 0.2 parts by weight, the dispersiveness of the ferromagnetic powder may be lowered and there may be some instances where the runnability of the medium may be lowered. On the other hand, when exceeding 10 parts by weight, there may sometimes cause the ooze of fatty acid or the lowering of output. The fatty acid ester may be added in an amount of, usually, 0.1 to 10 parts by weight to 100 parts by weight of the ferromagnetic powder used and, more preferably, 0.2 to 8.5 parts by weight. When the fatty acid ester is added in an amount of less than 0.1 parts by weight, there may be some instances where a still-durability may not satisfactorily be improved. On the other hand, when exceeding 10 parts by weight, there may be some instances where fatty acid ester may ooze and output may be lowered.

In order to achieve the above-mentioned effects more excellently, it is preferred that the weight ratio of the above-mentioned fatty acid to the fatty acid ester should be within the range of fatty acid/fatty acid ester=10/90 to 90/10. Furthermore, the above-mentioned fatty acid may be able to display a dispersant-like working effect. It is, therefore, considered that the use of the fatty acid may reduces the use of the other low-molecular weight dispersant so that the Young's modulus of the magnetic recording medium may be improved as much as the reduction of the other dispersant.

The above-mentioned fatty acid may be of the monobasic or the dibasic either.

The above-mentioned fatty acid include, preferably, those having 6 to 30 carbon atoms and, particularly, those having 12 to 22 carbon atoms. More concretely, they include, for example, caproic acid, caprylic acid, capric acid, lauric acid, myristic acid, palmitic acid, stearic acid, isostearic acid, linolenic acid, linolic acid, oleic acid, elaidic acid, behenic acid. malonic acid, succinic acid, maleic acid, glutaric acid, adipic acid, pimelic acid, azelaic acid, sebacic acid, 1,12-dodecanedicarboxylic acid, octanedicarboxylic acid, and so forth.

The above-mentioned fatty acid esters include, for example, oleyl oleate, isocetyl stearate, dioleyl maleate, butyl stearate, butyl palmitate, amyl palmitate, isobutyl oleate, stearyl stearate, lauryl oleate, octyl oleate, isobutyl oleate, 2-ethylhexyl stearate, ethyl stearate, 2-ethylhexyl palmitate, isopropyl palmitate, isopropyl myristate, butyl laurate, cetyl-2-ethyl hexalate, dioleyl adipate, diisodecyl adipate, and so forth.

Besides the above fatty acid and fatty acid ester, the other lubricants may also be used in the invention. For example, silicone oil including those modified with carboxylic acid or the esters thereof, graphite, fluorocarbon, molybdenum disulfide, tungsten disulfide, fatty acid amide, α-olefin oxide, and so forth.

They may be used independently or in combination.

Usually, the above-mentioned lubricants are used in an amount of 0.05 to 10 parts by weight to 100 parts by weight of the above-mentioned ferromagnetic powder.

The aforementioned abrasives include, for example, inorganic powder such as those of aluminium oxide, titanium oxide $TiO$ and $TiO_2$, α-iron oxide, silicon oxide $SiO$ and $SiO_2$, silicon carbide, cerium oxide, magnesium oxide, silicon nitride, zirconium oxide, chromium oxide, boron carbide, and so forth; and organic powder such as those of benzoguanazine resin, melamine resin, phthalocyanine compound, and so forth.

The average particle size of the above-mentioned abrasives is usually within the range of 0.01 to 1.0 μm.

The amount of those abrasives compounded is usually within the range of 0.5 to 20 parts by weight to 100 parts by weight of the ferromagnetic powder used.

The above-mentioned antistatic agents include, for example, conductive powder such as those of graphite, carbon black, tin oxide-antimony oxide type compounds, tin oxide-titanium oxide-antimony oxide type compounds, carbon black graft polymer and so forth; natural surfactants such as saponin and so forth; non-ionic surfactants such as those of alkylene oxide type, glycerol type, glycidol type, and so forth; cationic surfactants such as higher alkylamines, quaternary pyridine, the other heterocyclic compounds, phosphonium, sulfonium, and so forth; anionic surfactants containing carboxylic acid, sulfonic acid, phosphoric acid, or an acid group such as sulfate group, phosphate group and so forth; amphoteric surfactants such as those of amino acids, aminosulfonic acids, sulfuric acid esters or phosphoric acid esters of aminoalcohol, and so forth.

They may be used independently or in combination.

The above-mentioned antistatic agents are usually compounded in an amount of 0.5 to 20 parts by weight to 100 parts by weight of the ferromagnetic powder used.

The above-mentioned lubricants and antistatic agents or the later mentioned dispersants and so forth each perform not only their own independent functions but, sometimes, dual functions, that is, a single compound functions as both of a lubricant and an antistatic agent.

In the invention, the compounds are classified by their principal functions and, therefore, the functions of the classified compounds shall not be limited to the classified functions.

Next, the process of manufacturing magnetic recording media of the invention will be detailed.

Manufacturing process

The magnetic recording media of the invention may be prepared in the following manner. A magnetic paint is prepared by making silicon and aluminum adhere in the aforementioned method, for example, to the aforementioned ferromagnetic powder together with the magnetic layer forming components such as a binder having the above-mentioned anionic functional group into a solvent. The resulting magnetic paint is coated onto the aforementioned non-magnetic support and dried.

The solvents which can be used when dispersing with kneading magnetic layer forming components include, for example, those of the ketone type such as acetone, methylethylketone MEK, methylisobutylketone MIBK, cyclohexanone, and so forth; those of the alcoholic type such as methanol, ethanol, propanol, butanol, and so forth; those of the ester type such as methyl acetate, ethyl acetate, butyl acetate, ethyl lactate, propyl acetate, ethyleneglycol monoacetate, and so forth; those of the ether type such as diethleneglycol dimethylether, 2-ethoxyethanol, tetrahydrofuran, dioxane, and so forth; those of the aromatic hydrocarbon type such as benzene, toluene, xylene, and so forth; and those of the halogenated hydrocarbon type such as methylene chloride, ethylene chloride, carbon tetrachloride, chloroform, ethylene chlorohydrin, dichlorobenzene, and so forth.

When compounding the magnetic paint components by kneading, the above-mentioned ferromagnetic powder comprising adhesively the above-mentioned silicon and aluminum and the other magnetic paint components are fed at the same time or sequentially into a kneading machine. For example, the magnetic powder is added into a solution containing a dispersant first and, after kneading for a specific period of time, each of the remaining components is added and a further kneading is kept one, so that a magnetic paint is prepared.

When dispersing the paint components by kneading, various types of homogenizers may selectively be used. Such kneading machines include, for example, a dual-roll mill, a triple-roll mill, a ball-mill, a pebble-mill, a side-grinder, Sqegvari attriter, a high-speed impeller homogenizer, a high-speed stone-mill, a high-speed impact-mill, a disperkneader, a high-speed mixer, a homogenizer, a supersonic homogenizer, and so forth.

When dispersing the ferromagnetic powder adhesively comprising the silicon and aluminum with kneading, a dispersant may be used.

Such dispersants include, for example, lecithin, phosphate, amine compound, alkyl sulfate, fatty acid amide, higher alcohol, polyethylene oxide, sulfosuccinic acid, sulfosuccinate, well-known surfactant and so forth, and the salts thereof, the salts of the dispersant comprising a polymer of anionic organic groups such as —COOH or —PO$_3$H, and so forth.

These dispersants may be used independently or in combination.

Usually, the above-mentioned dispersants may be added in an amount of 0.1 to 10 parts by weight to 100 parts by weight of the ferromagnetic powder used.

The coating solution containing the magnetic layer forming components thus prepared is coated on a non-magnetic support in a well-known method.

The coating methods applicable to the invention include, for example, a gravure-roll coating, a wire-bar coating, doctor-blade coating, a reverse-roll coating, a dip coating, an air-knife coating, a calendar coating, a squeeze coating, a kiss coating, a fountain coating, and so forth.

Usually, the thickness of the magnetic layer thus coated is 0.5 to 20 μm in the dry.

After coating the magnetic layer forming components, a magnetic field orientation treatment (500 to 3000 Gauss, for example) is carried out in the undried state, if required. Further, a surface smoothing treatment is carried out usually with a super-calendar roll or the like.

Next, a magnetic recording medium can be completed by cutting into a desired shape.

The magnetic recording media of the invention may be used for magnetic tapes such as a video-tape, an audio-tape and so forth when cutting into a long strip-shape, or for floppy disks and so forth when cutting into a disk-shape. Furthermore, they may be used similar to the ordinary types of magnetic recording media when cutting into a card-shape, cylindrical-shape or the like.

EXAMPLES

Next, the invention will be more detailed with reference to the examples and the comparative examples given below. In the examples and the comparative examples, the word, 'part', represents 'part by weight'.

EXAMPLE 1

A magnetic paint was prepared in the following manner. The magnetic layer forming components having the following compositions were mixedly dispersed for 3 hours by means of a sand-mill. The resulting dispersed solution was added and mixed with 5 parts of polyisocyanate compound. Thus, the magnetic paint was prepared.

| | |
|---|---|
| Co-containing $\gamma$-$Fe_2O_3$ powder (Specific surface area obtained in BET method was 50 $m^2/g$) | 100 parts |
| $SiO_2$ | 0.64 parts |
| $Al_2O_3$ | 0.057 parts |
| Potassium sulfonate-containing vinyl chloride copolymer [The concentration of the potassium sulfonate to the copolymer was 0.03 mol/g, and the degrees of polymerization of the copolymer were 300.] | 15 part |
| Thermoplastic polyurethane resin (Estan, a trade name, manufactured by Goodrich Co.) | 7 parts |
| Myristic acid | 1 part |
| Butyl myristate | 1 part |
| Polyisocyanate (Colonate L, a trade name, manufactured by Japan Polyurethane Industrial Co.) | 5 parts |
| Methylethylketone | 125 parts |
| Toluene | 125 parts |
| Carbonblack (Average particle size was 20 m$\mu$) | 5 parts |

The resulting magnetic paint was coated on a 15 $\mu$m-thick polyethyleneterephthalate film so as to have a dried thickness of 4 $\mu$m.

Next, after solvent was removed with heating, the coated film was put under a super-calendar treatment and was then subjected to a surface smoothing treatment under the conditions of a temperature of 60° to 80° C. and a pressure of 100 to 300 kg/cm. The resulting film was cut into a desired width, so that a video-tape was prepared.

About the video-tape, the various characteristics thereof were measured and evaluated.

The results thereof are shown in Table 1.

The respective characteristics were measured in the following manners.

Squareness ratio:
Using a VSM in the measuring magnetic field of 10 KOe, the ratio Bm/Br of a residual magnetic flux density Br to a saturated magnetic flux density Bm was measured.

RF Output:
The outputs regenerated by a 100% white signal were obtained on the basis of and in comparison with the output of the tape of Example 2.

Luminescence-S/N:
Using a noisemeter manufactured by Shibasoku Co., the differences of S/N generated by a 100% white signal were obtained, on the basis of and in comparison with the standard tape manufactured by Konica Corporation.

Chromatography-S/N:
Using a noisemeter manufactured by Shibasoku Co., the differences of S/N generated by a chromatographic signal were obtained, on the basis of and in comparison with the standard tape manufactured by Konica Corporation.

Running durability:
Using an HR-S7000 manufactured by Japan Victor Co. and running the prepared video-tape for 100 hours, the evaluations were made by observing whether or not an edge damage occurred.

The marks appeared in Table 1 have the following meanings:

| | |
|---|---|
| No edge damage occurred | A |
| Edge damages partly occurred | B |
| Edge damages occurred in full length | C |

EXAMPLE 2

A video-tape was prepared in the same manner as in Example 1, except that silicon and aluminium used in Example 1 were herein used in the percentages by weight shown in Table 1, and the various characteristics were measured and then evaluated. The results thereof are shown in Table 1.

COMPARATIVE EXAMPLES

Comparative Example 1

A video-tape was prepared in the same manner as in Example 1, except that, among the magnetic paint components in Example 1, silicon and aluminum of Example 1 were herein used in the percentage by weight shown in Table 1, and the various characteristics of the video-tape were measured.

The results thereof are shown in Table 1.

Comparative Example 2

A video-tape was prepared in the same manner as in Example 1, except that, among the magnetic paint components in Example 1, potassium sulfonate-containing vinyl chloride copolymer was replaced by VAGH manufactured by Union Carbide Co. (The VAGH was a copolymer of vinylchloride and vinyl acetate.) The various characteristics of the resulting video-tape were measured.

The results thereof are shown in Table 1.

Comparative Example 3

A video-tape was prepared in the same manner as in Example 1, except that, among the magnetic paint components in Example 1, silicon and aluminium used in Example 1 were herein used in the percentage by weight shown in Table 1.

The various characteristics of the resulting video-tape were measured.

The results thereof are shown in Table 1.

Comparative Example 4

A video-tape was prepared in the same manner as in Example 1, except that, among the magnetic paint components in Example 1, $SiO_2$ and $Al_2O_3$ were not used herein.

The various characteristics of the resulting video-tape were measured, and evaluated.

The results thereof are shown in Table 1.

EXAMPLE 3

A video-tape was prepared in the same manner as in Example 1, except that the potassium sulfonate-containing vinyl chloride copolymer used in Example 1 was replaced by vinyl chloride copolymer containing a

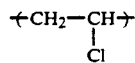

group in a proportion of 94.8% by weight, a

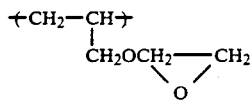

group in a preparation of 4.0% by weight, a

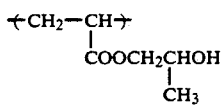

group and a

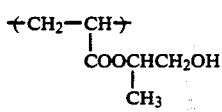

group in a proportion of 0.4% by weight, and a $-SO_3Na$ group in a proportion of 0.8% by weight.

The various characteristics of the resulting video-tape were measured.

The results thereof are shown in Table 1.

EXAMPLE 4

A video-tape was prepared in the same manner as in Example 1, except that thermoplastic polyurethane resin used in Example 1 was replaced by a sulfo group-containing polyurethane manufactured by Toyo Boseki Co. under the trade name of UR-8300.

The various characteristics of the resulting video-tape were measured.

The results thereof are shown in Table 1.

TABLE 1

| | Content in ferromagnetic powder (wt %) | | Magnetic property Squareness ratio (Br/Bm) | Runnin durability | Electromagnetic conversion characteristics | | |
|---|---|---|---|---|---|---|---|
| | Si | Al | | | RF output (dB) | Lumi- -S/N (dB) | Chroma- -S/N (dB) |
| Example 1 | 0.3 | 0.03 | 0.85 | A | +2.5 | +2.4 | +1.0 |
| Example 2 | 0.1 | 0.03 | 0.84 | A | +2.3 | +2.3 | +0.8 |
| Comparative 1 | 0.3 | 0.15 | 0.83 | B | +2.2 | +2.3 | +0.8 |
| Comparative 2 | 0.3 | 0.03 | 0.77 | C | +1.0 | +1.1 | +0.5 |
| Comparative 3 | 0.08 | 0.02 | 0.83 | B | +1.8 | +1.9 | +0.7 |
| Comparative 4 | 0 | 0 | 0.82 | C | +1.5 | +1.7 | +0.6 |
| Example 3 | 0.2 | 0.04 | 0.85 | A | +2.6 | +2.5 | +1.1 |
| Example 4 | 0.2 | 0.04 | 0.86 | A | +2.7 | +2.6 | +1.2 |

Evaluation

As is obvious from Table 1, it is found that, in the invention, silicon and aluminum each in a specific amount are made to adhere to ferromagnetic powder and the binder contains an anionic functional group, therefore, any and every running durability. magnetic characteristics, and magnetic conversion characteristics are improved.

What is claimed is:

1. A magnetic recording medium comprising a non-magnetic support having thereon a magnetic layer comprising ferromagnetic powder containing silicon and aluminium, wherein the silicon content of said ferromagnetic powder is not less than 0.1% by weight, and the ratio by weight of silicon to aluminium is not less than 3, and said magnetic layer contains a binder having an anionic functional group.

2. The magnetic recording medium of claim 1, wherein the silicon content of said ferromagnetic powder is within the range of from 0.1% to 1% by weight.

3. The magnetic recording medium of claim 1, wherein said anionic functional group is $-SO_3M$, $-OSO_2M$, $-COOM$ or $OM^1$
$-P=O$, wherein M represents a hydrogen atom,
$OM^2$
a lithium atom or a sodium atom; and $M^1$ and $M^2$ are each a hydrogen atom, a lithium atom, a potassium atom, a sodium atom or an alkyl group, provided that $M^1$ and $M^2$ may be different from or the same with each other.

4. The magnetic recording medium of claim 1, wherein said binder comprises at least one polymer selected from a vinyl chloride copolymer, a polyester and a polyurethane, each of said polymers have said anionic functional group.

5. The magnetic recording medium of claim 4, wherein said anionic functional group is $-SO_3M$, $-OSO_2M$, $-COOM$ or $OM^1$
$-P=O$, wherein M represents a hydrogen atom,
$OM^2$
a lithium atom or a sodium atom; and $M^1$ and $M^2$ each a hydrogen atom, a lithium atom, a potassium atom, a sodium atom or an alkyl group, provided that $M^1$ and $M^2$ may be different from or the same with each other.

* * * * *